(12) United States Patent
Sigmund et al.

(10) Patent No.: US 10,151,837 B2
(45) Date of Patent: Dec. 11, 2018

(54) OPTOELECTRONIC SENSOR

(71) Applicant: SICK AG, Waldkirch (DE)

(72) Inventors: Jorg Sigmund, Waldkirch (DE); Markus Hammes, Waldkirch (DE)

(73) Assignee: Sick AG, Waldkirch (DE)

( * ) Notice: Subject to any disclaimer, the term of this patent is extended or adjusted under 35 U.S.C. 154(b) by 335 days.

(21) Appl. No.: 14/925,322

(22) Filed: Oct. 28, 2015

(65) Prior Publication Data

US 2016/0154105 A1    Jun. 2, 2016

(30) Foreign Application Priority Data

Dec. 2, 2014 (EP) ..................... 14195860

(51) Int. Cl.
*G01S 17/89* (2006.01)
*G01S 7/481* (2006.01)
(Continued)

(52) U.S. Cl.
CPC ............ *G01S 17/89* (2013.01); *G01S 7/4816* (2013.01); *G01S 7/4868* (2013.01); *G01V 8/20* (2013.01); *G02B 3/0056* (2013.01); *G02B 5/201* (2013.01)

(58) Field of Classification Search
CPC ............ G01B 11/2527; G01B 11/2536; G01S 7/4815; G01S 7/4818; G01S 7/484; G01S 7/486; G01S 7/499; G01S 17/48
See application file for complete search history.

(56) References Cited

U.S. PATENT DOCUMENTS 4,690,549 A * 9/1987 Nakada ................. G01C 3/32
356/4.04
2003/0178549 A1 9/2003 Ray
(Continued)

FOREIGN PATENT DOCUMENTS

DE    10 2004 003 013 B3    6/2005
DE    10 2008 016 766 A1    11/2009
(Continued)

OTHER PUBLICATIONS

Search Report issued in European Patent application No. EP 14 19 5860.3 dated Aug. 6, 2015.
(Continued)

*Primary Examiner* — Luke D Ratcliffe
(74) *Attorney, Agent, or Firm* — Nath, Goldberg & Meyer; Jerald L. Meyer; Stanley N. Protigal

(57) ABSTRACT

An optoelectronic sensor for the distance measurement of objects (2) in a monitored zone (4) using a time of flight method, having a light receiver (5) for receiving light from the monitored zone (4) and for outputting received signals (10), and having an evaluation unit (12) for determining the time of flight from the received signals (10), wherein the light receiver (5) is an image sensor (6) having a plurality of light reception elements (8) which are arranged in a planar manner in a matrix, wherein a first optical element (14) is arranged in front of at least one light reception element (8), with the first optical element (14) having a filter element (18) of a filter array (24), wherein at least respective first filter elements (20) and at least respective second filter elements (22) have different optical attenuations and/or the first optical element (14) has a lens (28) of a fly's eye optics (26), with the fly's eye optics (26) having a plurality of lenses (28), with a respective lens (28) being associated with at least one respective light reception element (8).

16 Claims, 13 Drawing Sheets

Figure 1:
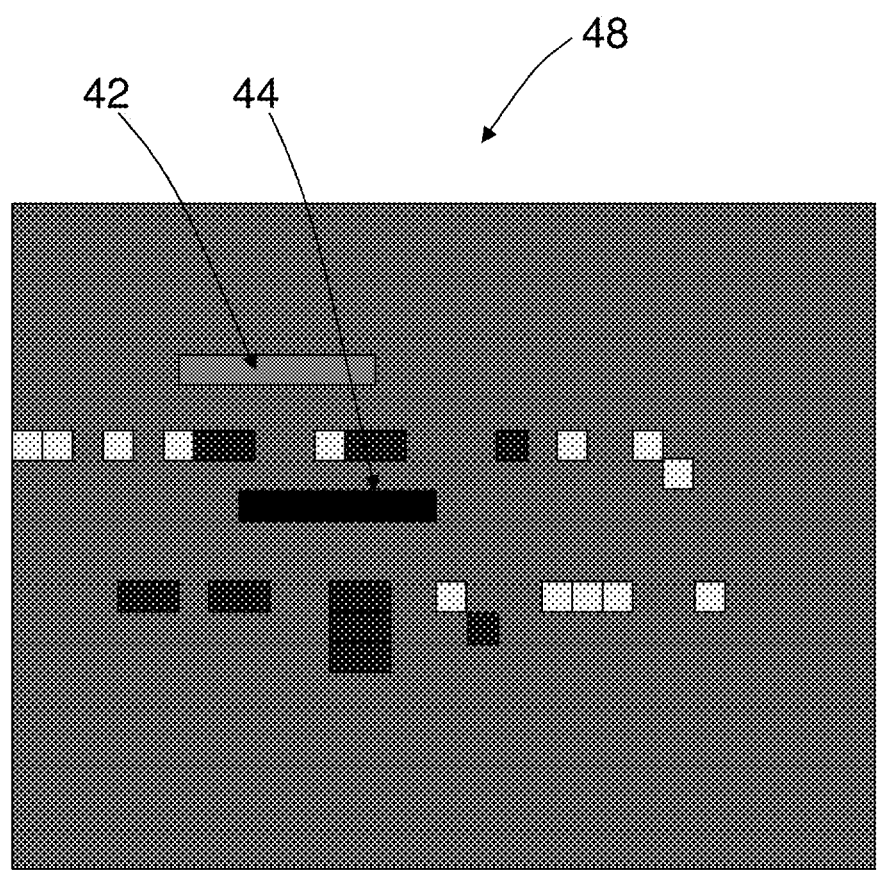

(51) Int. Cl.
*G01V 8/20* (2006.01)
*G01S 7/486* (2006.01)
*G02B 3/00* (2006.01)
*G02B 5/20* (2006.01)

(56) References Cited

U.S. PATENT DOCUMENTS

| | | | |
|---|---|---|---|
| 2007/0182949 A1* | 8/2007 | Niclass | G01C 3/08 356/3 |
| 2010/0008588 A1* | 1/2010 | Feldkhun | G01B 11/2518 382/206 |
| 2013/0083316 A1 | 4/2013 | Mimeault et al. | |

FOREIGN PATENT DOCUMENTS

| | | |
|---|---|---|
| EP | 1 979 769 A1 | 10/2008 |
| EP | 1 979 769 B1 | 9/2011 |

OTHER PUBLICATIONS

Martini, et al., "Uniformity of Concentration Factor and BFL in Microlens Array for Image Dectectors Applications", Optical Society of America, 2009.

Charbon, et al., "SPAD-Based Sensors", TOF Range-Imaging Cameras, Springer-Verlag Berlin Heidelberg, 2013.

* cited by examiner

OPTOELECTRONIC SENSOR

The present invention relates to an optoelectronic sensor for the distance measurement of objects in a monitored zone using a time of flight method in accordance with the preamble of claim 1.

Camera sensors or image sensors based on the time of flight are already known in accordance with the prior art. These camera sensors have low dynamics, however. The camera sensors furthermore have optical cross-talk between adjacent image regions in conjunction with an imaging optics. These restrictions have previously made the use of camera sensors based on the time of flight more difficult in safety technology.

A case which is particularly critical for technical safety applications is represented by scenes in which a dark foreground object is adjacent to a very bright background object laterally in the image. It can occur here that, due to scattered light in the received beam path or also due to so-called ghost images which arise due to multiple reflections in the imaging optics, light portions of both the foreground object and the adjacent background object are measured on a pixel. With unfavorable intensity distributions, a TOF image sensor will also associate the distance value of the background with the foreground or will output an intermediate value. This displacement of a real object away from the sensor can result in a dangerous failure of the detection capability and therefore has to be precluded in technical safety applications. Distorted regions can occur in the image, for example, depending on the shot. The sensor or a camera can no longer provide any distance information in the distorted regions due to a restricted dynamic range. At the same time, these distorted images can produce, as a ghost image, a falsified distance value at another point of the image sensor since here the signal portion of the ghost image is mixed with the signal of the actual background on the image sensor. The same effect can also produce an increase in the distance value in other scenes.

The reason for this optical cross-talk between adjacent image regions can be due to the common use of a single received beam path through a number of different directions of gaze.

The classical optical image generation in accordance with this principle admittedly has the advantage that the image can be directly stored or used further without further processing and can additionally be produced by a simple arrangement of macroscopic lenses. Disadvantages also include, however, in addition to the large volume of the imaging optics, the proneness for interactions or mutual interference of adjacent image regions. It is just this feature which is particularly disturbing in combination with TOF image sensors.

An object of the invention comprises improving the dynamics of an image sensor based on the time of flight and/or improving optical cross-talk between adjacent image regions of an image sensor based on the time of flight.

The object is achieved in accordance with claim 1 by an optoelectronic sensor for the distance measurement of objects in a monitored zone using a time of flight method, having a light receiver for receiving light from the monitored zone and for outputting received signals, and having an evaluation unit for determining the time of flight from the received signals, wherein the light receiver is an image sensor having a plurality of light reception elements which are arranged in a planar manner in a matrix, wherein a first optical element is arranged in front of at least one light reception element, with the first optical element having a filter element of a filter array, with at least respective first filter elements and at least respective second filter elements having different optical attenuations and/or wherein the first optical element has a lens of a fly's eye optics, with the fly's eye optics having a plurality of lenses, with a respective lens being associated with at least one respective light reception element.

An image sensor based on the time of flight or a spatially resolving light receiver based on the time of flight has the advantage of capturing high-quality 3D data from the monitored zone at a high repetition rate. Such light receivers or image sensors are very inexpensive and, unlike a stereoscopic image process, do not require any complex and/or expensive evaluation unit, but rather only need a more inexpensive evaluation unit.

The 3D data determined using the optoelectronic sensor can be used in a versatile manner for automation applications and for safety applications. For example, for monitoring a dangerous zone around a machine or for the measurement and presence control of objects.

The filter array is an additional optical element which is located directly above the image sensor and which has the object of attenuating the light differently or of damping it differently in dependence on the position on the image sensor. The light reception elements, or picture elements or pixels, in a local vicinity are thereby used for different brightness zones. The different filter elements have different gray values, for example.

If, for example, four adjacent light reception elements having filter elements of different optical densities or different optical attenuations correspond, a dynamic range can be increased, for example by four decades, independently of the dynamics of the image sensor and in dependence on how different the different optical densities of the different filter elements are selected.

In accordance with the invention, a loss of resolution of the image sensor takes place in the filter elements since at least two light reception elements image an identical object point. On an application in the safety engineering area, that is with safe sensors which satisfy specific safety standards, for example the standards EN 61508 or EN 61496, a loss of resolution is acceptable, but not a distortion of the image sensor. A distortion of the image sensor is, however, avoided in accordance with the invention by the respective filter elements having different attenuation.

A distortion of the image sensor would produce a total loss of the image information and depth information, which is, however prevented in accordance with the invention. An HDR shot could admittedly also be carried out by repeated shots with different exposure times, but this has the large disadvantage of a long response time. Such a combined taken image with different exposure times is furthermore anyway not possible with mobile applications with fast-moving images or picture elements. In accordance with the invention, however, a distortion of the image sensor is avoided with a single shot, whereby a shorter response time of the sensor results. It is furthermore possible in accordance with the invention to take images of moving objects.

A cross-talk, that is an imaging of different object points on a single light reception element, is avoided by the fly's eye optics with individual lenses for at least one light reception element. In this respect, each lens of the fly's eye optics has its own optical axis. The optical axes of the lenses are aligned in parallel with one another in this respect. The lenses of the fly's eye optics lie in a common plane, for example, in this respect. An optical channel separation takes place between the light reception elements associated with the respective lenses by the lenses of the fly's eye optics.

The fly's eye optics with the individual lenses has the advantage that it has a very small volume with respect to a classical, single large lens. The fly's eye optics is in particular flatter than a single large lens. The optoelectronic sensor itself can thereby be very much smaller or more compact.

Very robust, small and inexpensive optoelectronic sensors can be produced in accordance with the invention. A production of the filter array in a parallel process as wafer optics and in the image sensor allows an integrated production of the optoelectronic sensor in a large volume in a continuous process. A combination of fly's eye optics and filter array can also be provided in the production.

In a further development of the invention, at least one first filter element and at least one second filter element form a group. The first filter element is in this respect associated with a first light reception element and the second filter element is associated with a second light reception element. The light reception elements which are associated with the group of filter elements form a picture element having a high dynamic range, also called an HDR pixel. An optical dynamic range can thereby be enlarged. The useful resolution of the image sensor is admittedly reduced, but the received distance information is more accurate and is subject to fewer errors.

In a further development of the invention, the filter elements of a group are arranged in a row and/or in a column. If the filter elements are arranged only in a respective row or only in a respective column, the resolution loss is avoided in a respective preferred direction and only occurs in the direction in which the filter elements are arranged in a group. The optical resolution can thereby be maintained in one direction and a high dynamic range can additionally be formed.

If the filter elements of a group are arranged in a respective one row and in a respective one column, a spatially compact, quadratic or rectangular region can, for example, be formed for the group so that, so-to-say, comparatively larger picture elements or pixels having a high dynamic range are formed. However, other shapes of the groups are also possible. It is thus conceivable that the filter elements are arranged in an L shape, for example, whereby the loss of resolution is avoided in comparison with rectangular or quadratic structures.

From a technical production aspect, the filter elements can be applied row-wise, region-wise or individually for each light reception element.

In a further development of the invention, the filter elements of a group are arranged in a rectangular area of at least four filter elements. A pixel is thereby formed which is so-to-say four times larger in area, but which offers a four times higher dynamic due to the four filter elements each formed with different attenuation. This solution offers the advantage that the resolution is only halved in respective perpendicular directions with respect to one another, but the dynamic range is simultaneously quadrupled.

In a further development of the invention, at least two light reception elements form a light reception element group, wherein a respective single lens of the fly's eye optics is associated with a respective one light reception element group.

In a further development of the invention, the fly's eye optics is configured to image a single object point on at least two different light reception elements, whereby a redundant imaging takes place.

In this case, image overlap regions of adjacent separate fields of view can be provided. Redundant image information is thus present.

In this respect, a complete duplication of image regions can be provided.

This redundant image information allows an effective suppression of interference effects. This is particularly of advantage for technical safety applications since a testing allows the revealing of light reception element errors or pixel errors, e.g. hot pixels or fix pattern noise- A direction of gaze of a field of view is fixed by the position and shape of the associated lens relative to the corresponding light reception element.

In a further development of the invention, the first optical element is a lens of a fly's eye optics, wherein the fly's eye optics has a plurality of lenses, with one lens being associated with exactly one light reception element. A one-to-one association is thereby implemented between the lens and the light reception element. This is of advantage with large light reception elements or pixels and rather small resolutions.

In a further development, the light reception element has at least one single photon avalanche diode. A single photon avalanche diode is also called a SPAD. In this respect, the light reception element can also be formed by an array of single photon avalanche diodes.

The detection surface of the image sensor in this respect has a plurality of light reception elements or pixels, wherein each light reception element has at least one single photon avalanche diode or SPAD. Each of the single photon avalanche diodes is connected to the evaluation unit directly or indirectly via further interposed components. The evaluation unit is in this respect adapted to determine a distance between the image sensor or the optoelectronic sensor and the objects in the monitored zone on the basis of the received reception signals.

A single photon avalanche diode generally has the property of requiring a certain recovery time after the triggering by a photon until the SPAD is sensitive again. In this dead time, the actual signal cannot be recognized even though the level is above the extraneous light level. If regions of different sensitivity are created in the SPAD image sensor by the filter elements, it can be achieved that the image sensor remains capable of detection.

It is achieved by means of the fly's eye optics to combine the high sensitivity of the SPAD array and the image information with an additional spatial resolution.

In a further development of the invention, a narrow band interference filter is arranged in front of the image sensor. Interfering extraneous light can be effectively suppressed by the narrow band interference filter.

A light transmitter can furthermore be provided with which the monitored zone is illuminated. The light transmitter can be a light source, for example a light emitting diode, a light emitting diode light source, a laser diode or a laser. The light is in this respect optionally modulated, temporally modulated or transmitted cyclically pulsed. The temporal modulation can in this respect take place continuously and/or periodically, for example sinusoidally. Pulse groups can also be cyclically transmitted.

Figure 2:
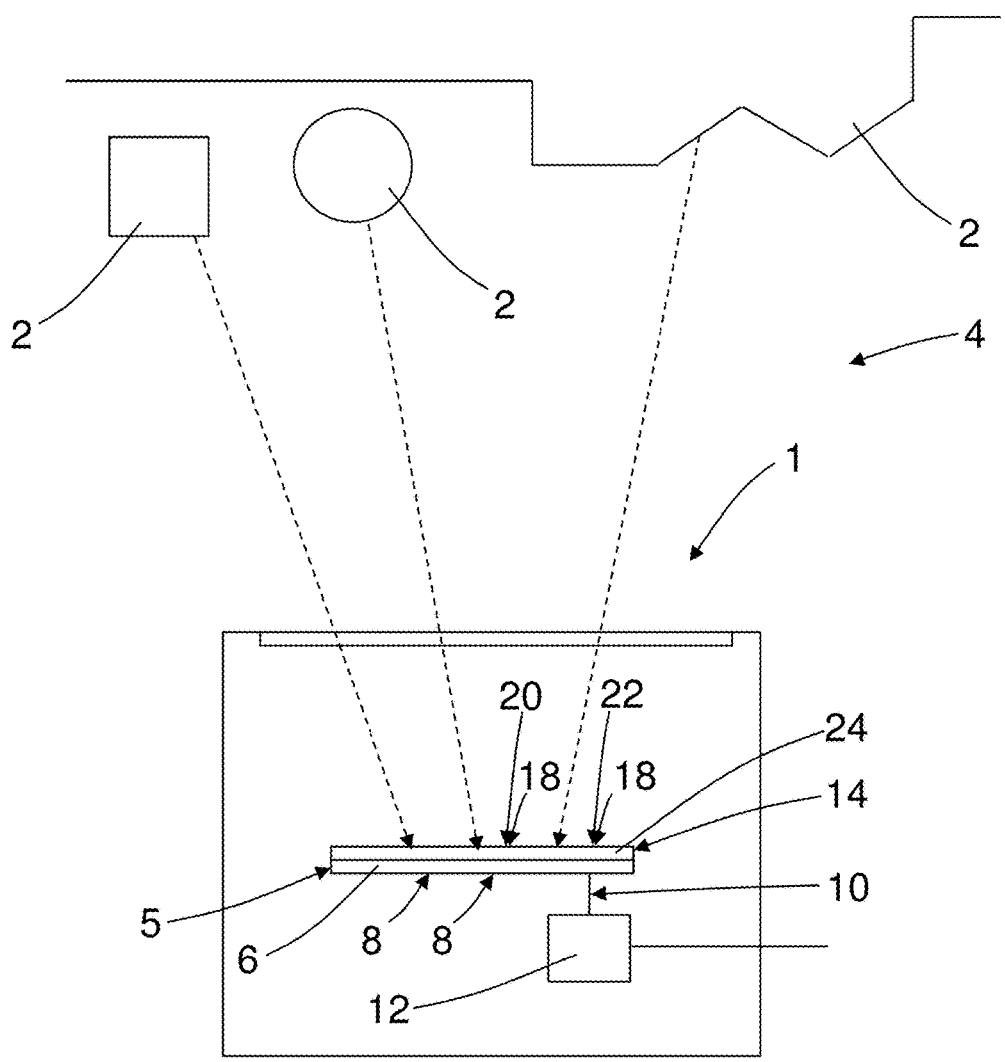
Figure 3:
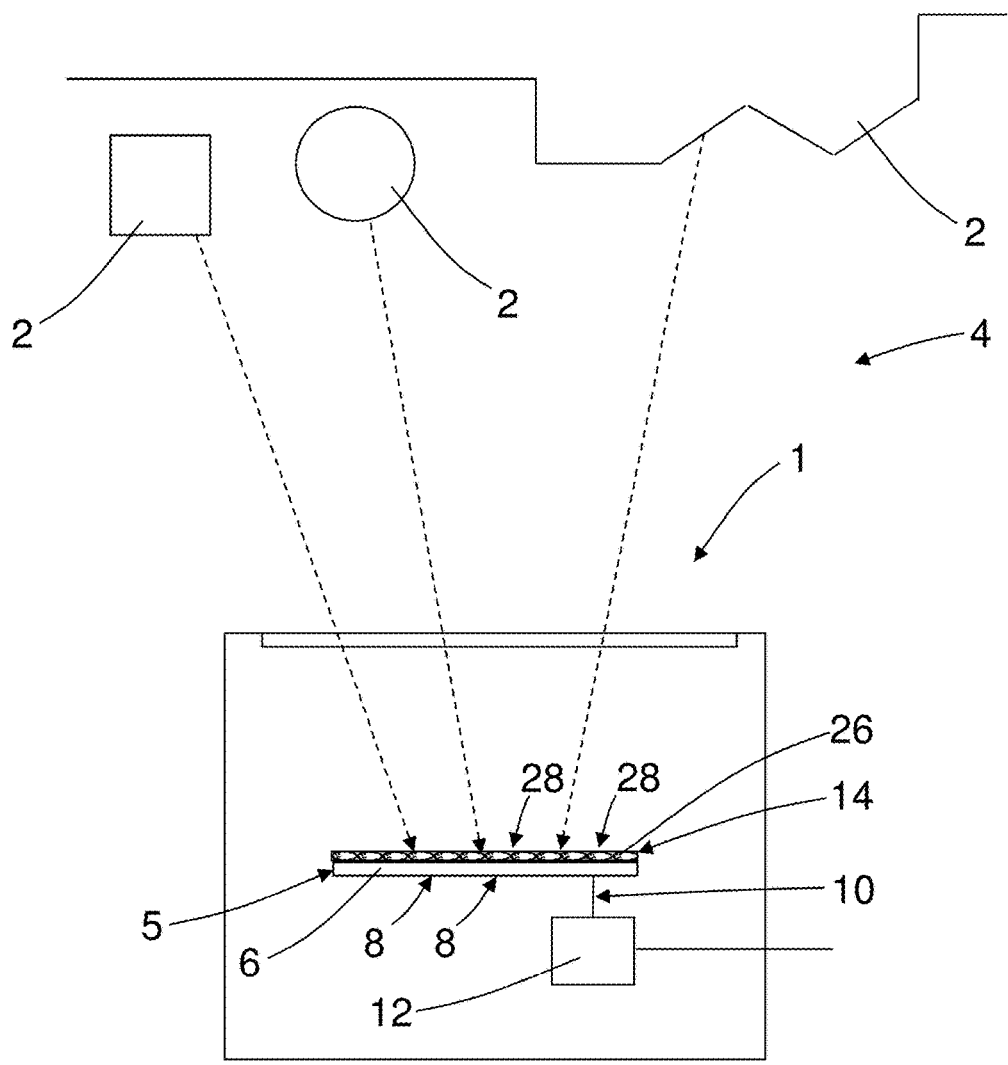
Figure 4:
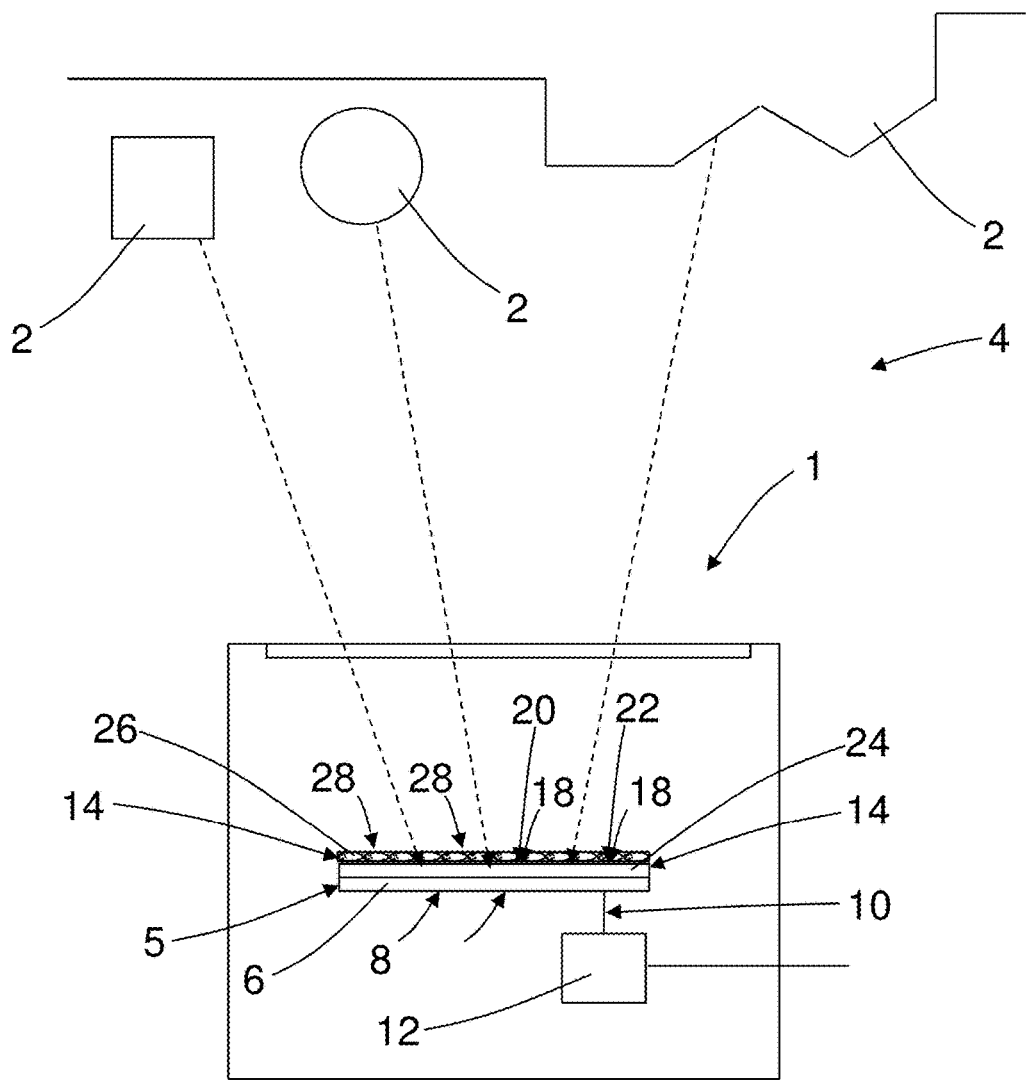
Figure 5:
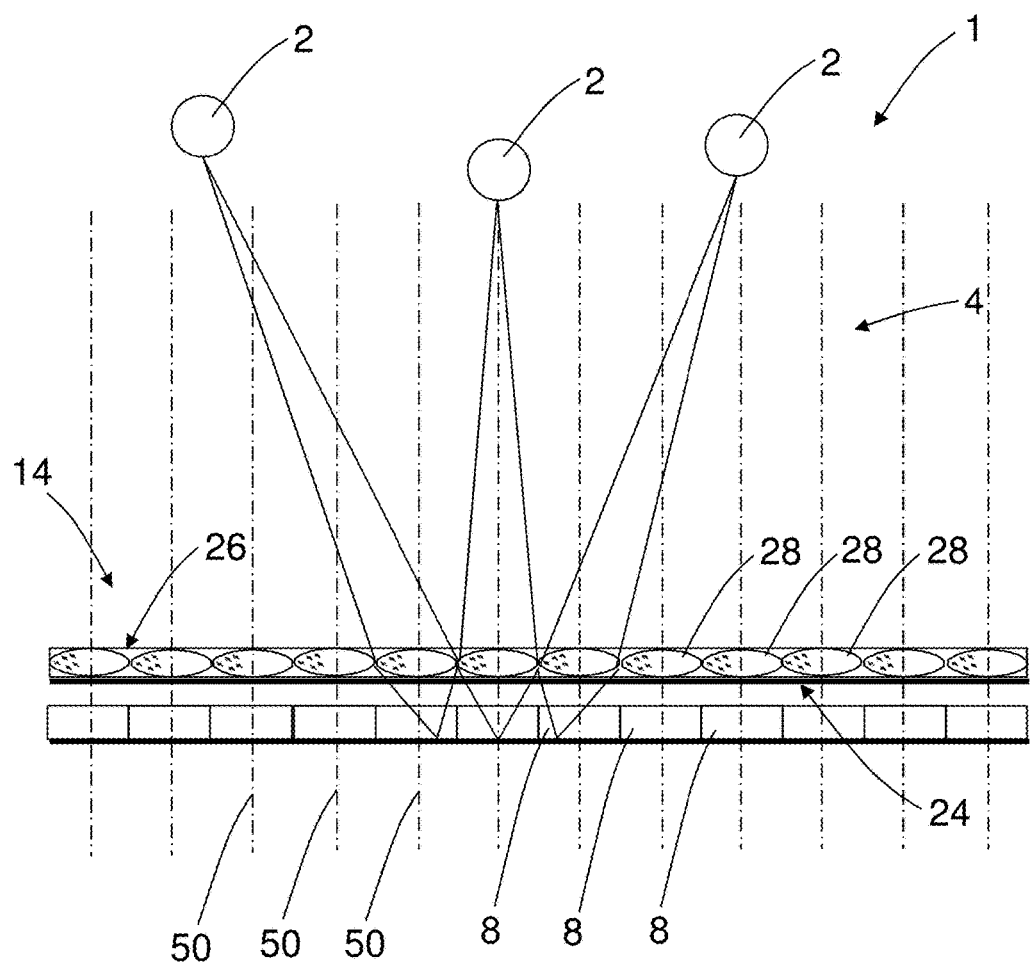
Figure 6:
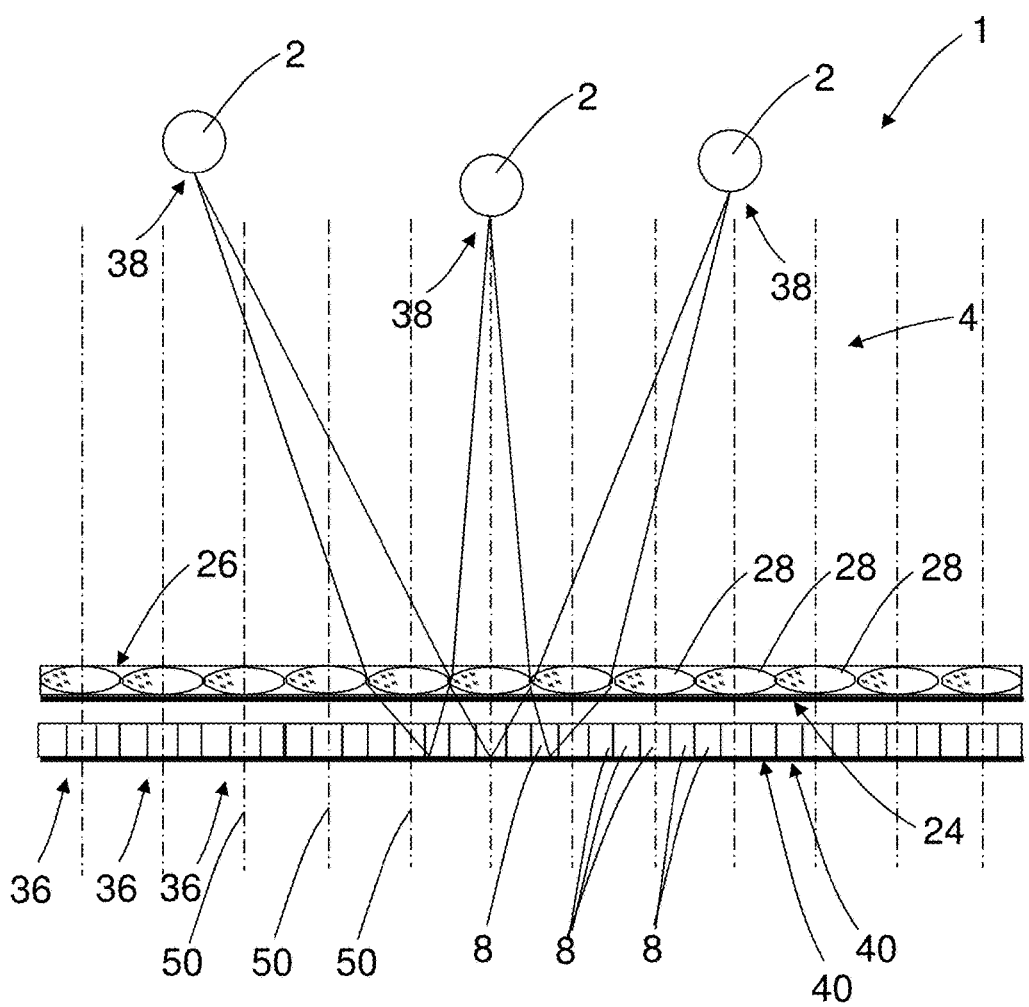
Figure 7:
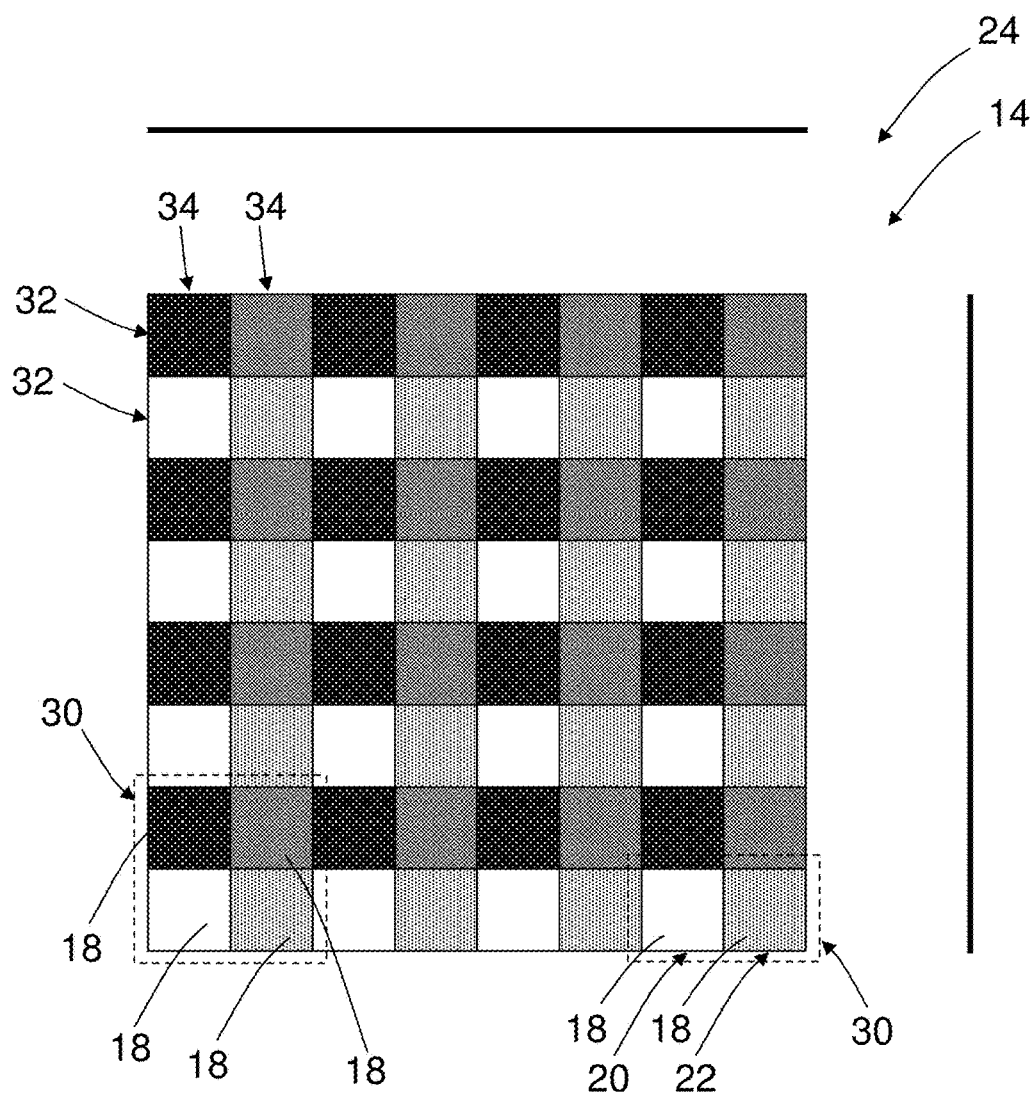
Figure 8:
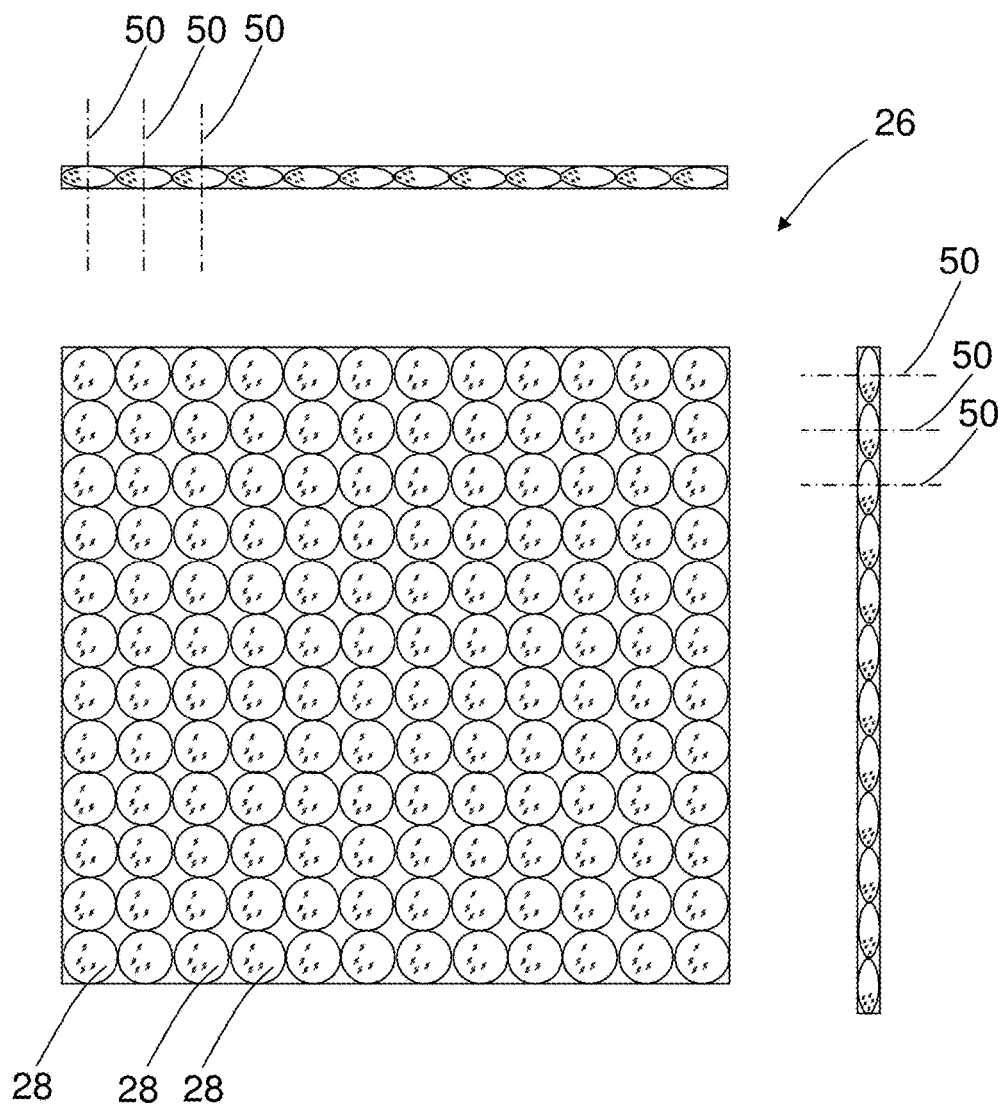
Figure 9:
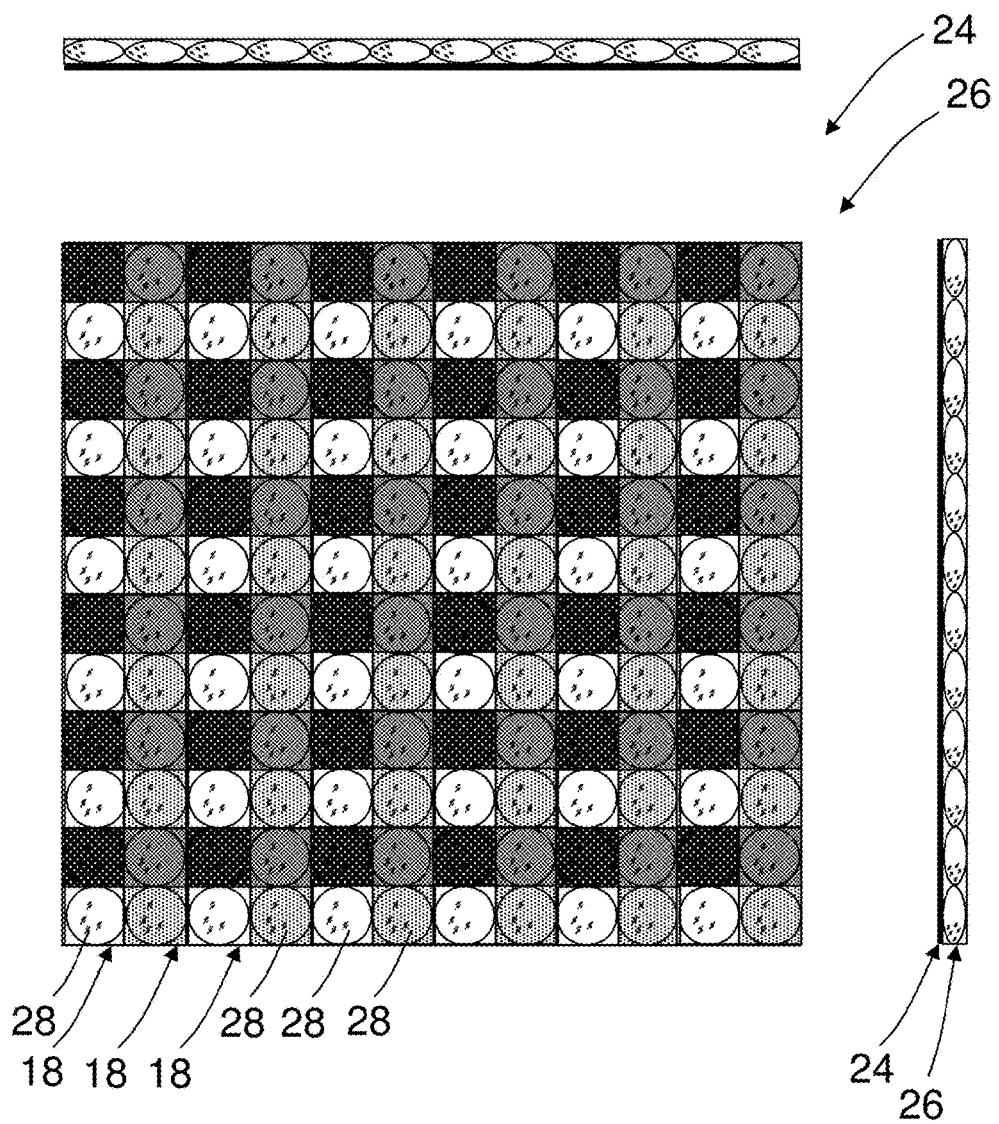
Figure 10:
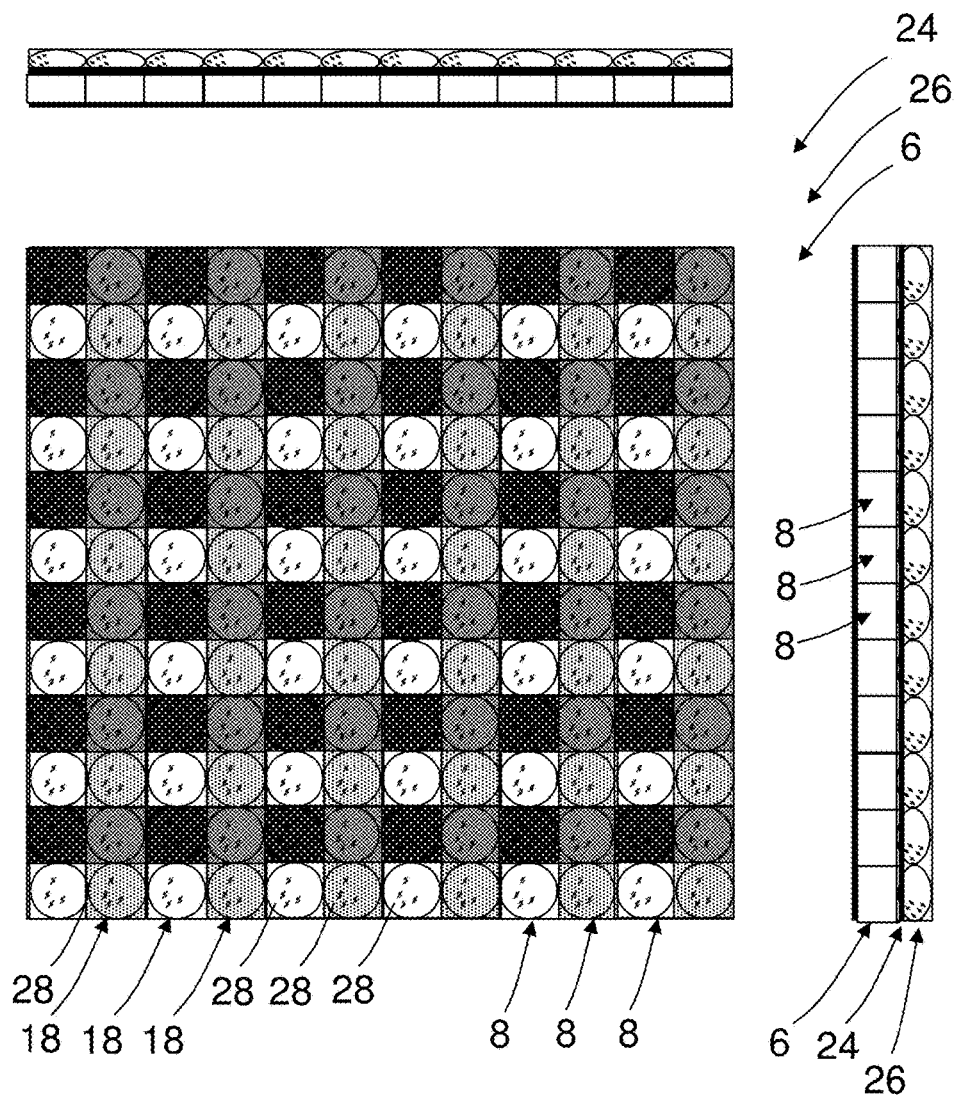
Figure 11:
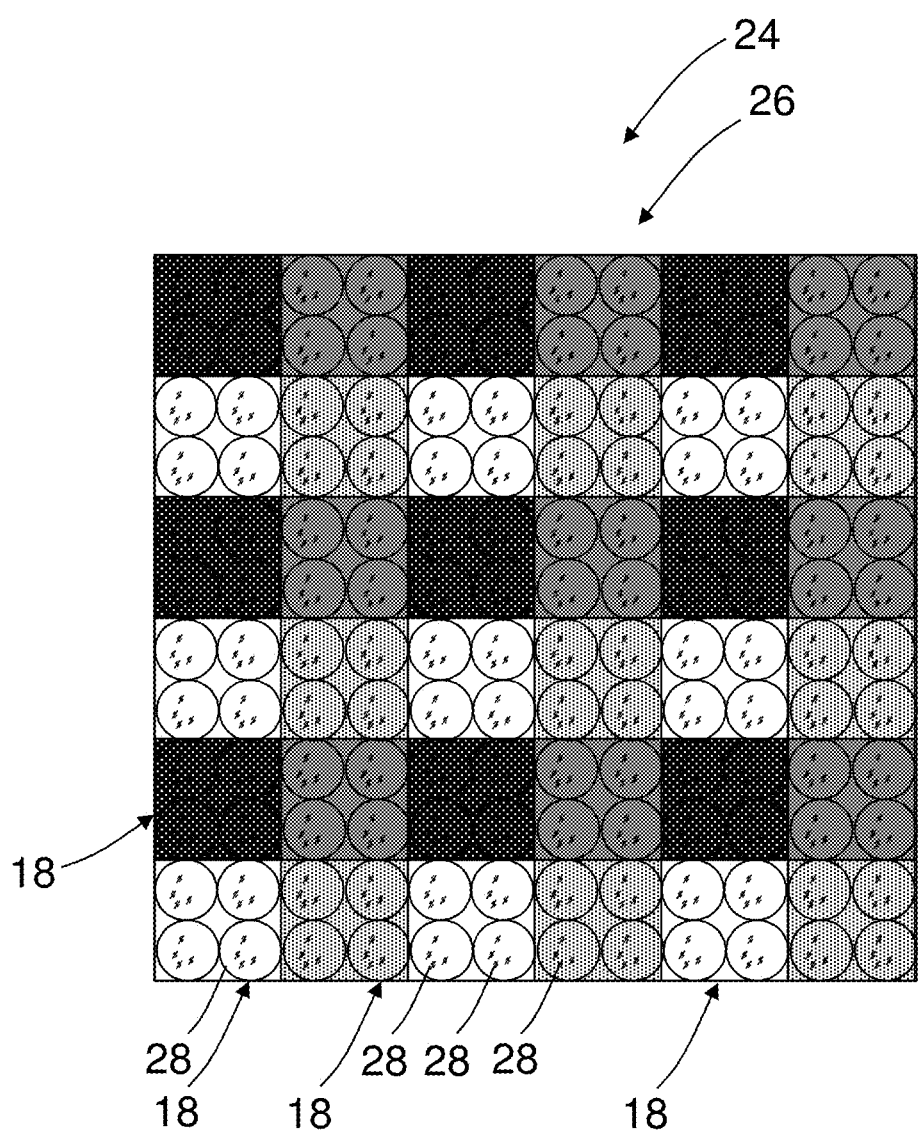
Figure 12:
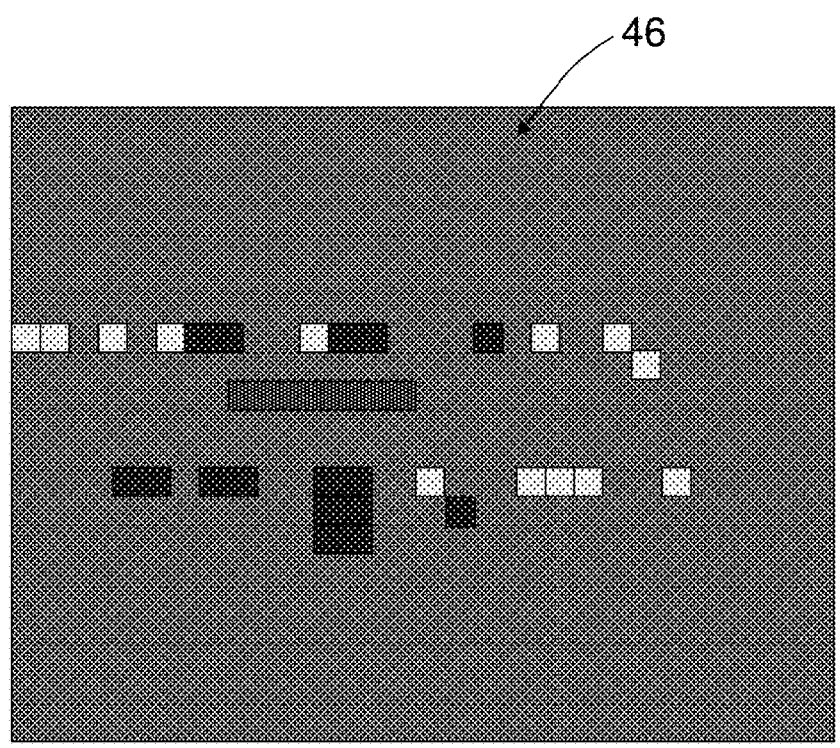
Figure 13:
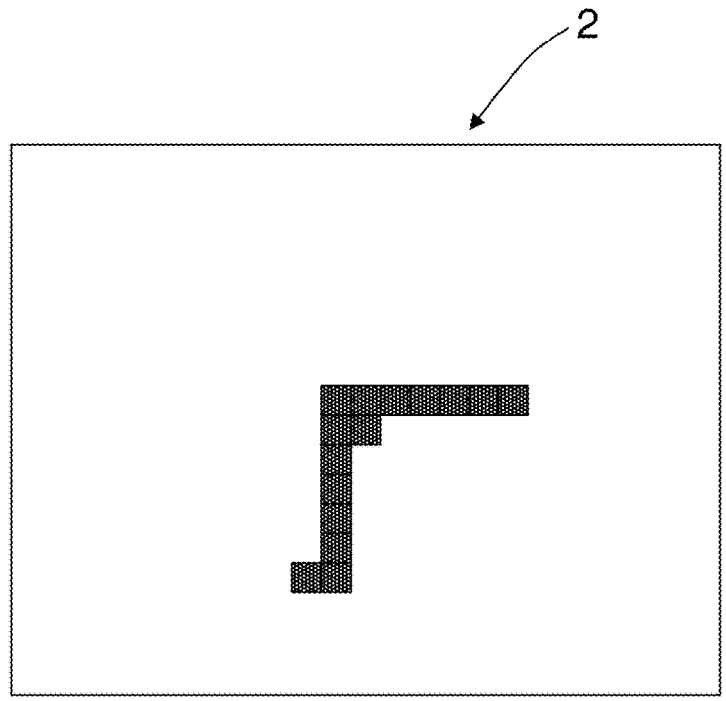

The invention will also be explained in the following with respect to further advantages and features with reference to the enclosed drawing and to embodiments. The Figures of the drawing show in:

FIG. 1 an image in accordance with the prior art with a ghost image region:;

FIG. 2 an optoelectronic sensor with a filter array;

FIG. 3 an optoelectronic sensor with a fly's eye optics;

FIG. 4 an optoelectronic sensor with a filter array and a fly's eye optics;

FIG. 5 a fly's eye optics and a filter array with optical beam paths in a side view;

FIG. 6 a further fly's eye optics and a filter array with optical beam paths in a side view;

FIG. 7 a filter array in three different views;

FIG. 8 a fly's eye optics in three different views;

FIG. 9 a filter array and a fly's eye optics in three different views;

FIG. 10 a filter array, a fly's eye optics and an image sensor in three different views;

FIG. 11 a filter array and a fly's eye optics, with four lenses being associated with one filter element;

FIG. 12 an image of the image sensor in accordance with the invention;

FIG. 13 an object which should be imaged by the image sensor; and

Figure 14:
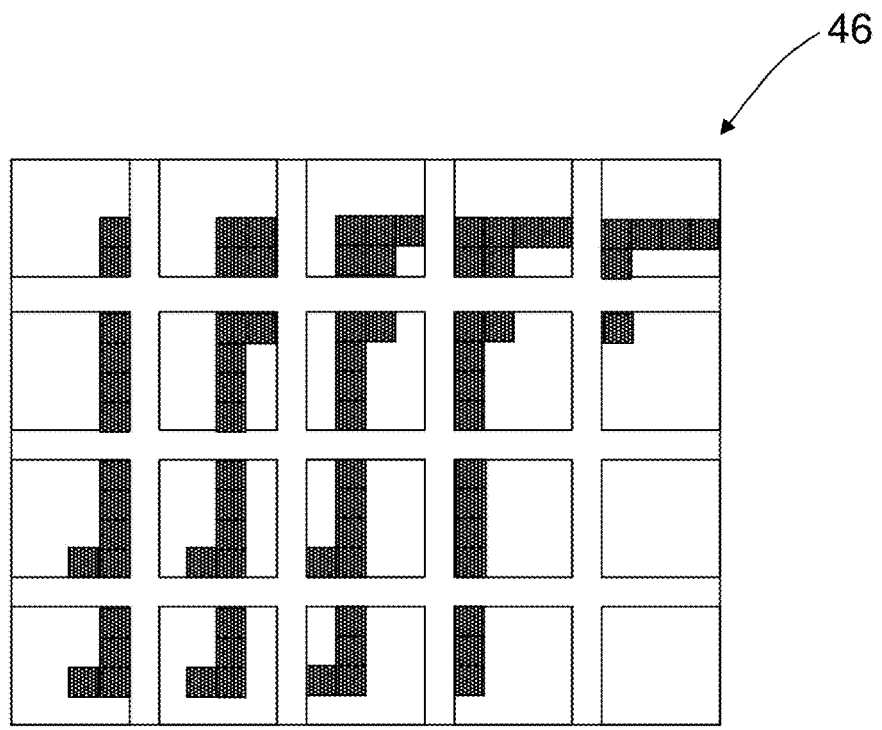

FIG. 14 a redundant image of an object on the image sensor in accordance with the invention.

In the following Figures, identical parts are provided with identical reference numerals.

FIG. 1 shows an image 48 in accordance with the prior art with a ghost image 42 or a ghost image region. The image has been taken with a conventional TOF camera in accordance with the prior art, wherein a conventional lens in accordance with the prior art was used. A distorted region 44 has occurred in the image region in the image 48. The sensor or a camera can no longer provide any distance information in the distorted regions 44 due to a restricted dynamic range. At the same time, this distorted region 44 will result as a ghost image 42 or ghost image region in a falsified distance value at another point of the image 48 of the image sensor since the signal portion of the ghost image 42 is here mixed with the signal of the actual background on the image sensor. The same effect can also produce an increase in the distance value in other scenes.

FIG. 2 shows an optoelectronic sensor 1 for the distance measurement of objects 2 in a monitored zone 4 using a time of flight method, having a light receiver 5 for receiving light from the monitored zone 4 and for outputting received signals 10, and having an evaluation unit 12 for determining the time of flight from the received signals 10, wherein the light receiver 5 is an image sensor 6 having a plurality of light reception elements 8 which are arranged in a planar manner in a matrix, wherein a first optical element 14 is arranged in front of at least one light reception element 8, with the first optical element 14 having a filter element 18 of a filter array 24, with at least respective first filter elements 20 and at least respective second filter elements 22 having different optical attenuations.

FIG. 3 shows an optoelectronic sensor 1 for the distance measurement of objects 2 in a monitored zone 4 using a time of flight method, having a light receiver 5 for receiving light from the monitored zone 4 and for outputting received signals 10, and having an evaluation unit 12 for determining the time of flight from the received signals 10, wherein the light receiver 5 is an image sensor 6 having a plurality of light reception elements 8 which are arranged in a planar manner in a matrix, wherein a first optical element 14 is arranged in front of at least one light reception element 8, with the first optical element 14 having a lens 28 of a fly's eye optics 26, wherein the fly's eye optics 26 has a plurality of lenses 28, with a respective one lens 28 being associated with at least one respective light reception element 8.

FIG. 4 shows an optoelectronic sensor 1 for the distance measurement of objects 2 in a monitored zone 4 using a time of flight method, having a light receiver 5 for receiving light from the monitored zone 4 and for outputting received signals 10, and having an evaluation unit 12 for determining the time of flight from the received signals 10, wherein the light receiver 5 is an image sensor 6 having a plurality of light reception elements 8 which are arranged in a planar manner in a matrix, wherein a first optical element 14 is arranged in front of at least one light reception element 14, with the first optical element 14 having a filter element 18 of a filter array 24, wherein at least respective first filter elements 20 and at least respective second filter elements 22 have different optical attenuations and the first optical element 14 has a lens 28 of a fly's eye optics 26, with the fly's eye optics 26 having a plurality of lenses 28, with a respective lens 28 being associated with at least one respective light reception element 8. The filter array 24 is in this respect arranged between the light reception elements 8 and the fly's eye optics 26.

The 3D data determined using the optoelectronic sensor 1 can be used in a versatile manner for automation applications and for safety applications. For example, for monitoring a dangerous zone around a machine or for the measurement and presence control of objects.

FIG. 5 shows a fly's eye optics 26 and a filter array 24 with optical beam paths in a side view. In this respect, each lens 28 of the fly's eye optics 26 has its own optical axis 50. The optical axes 50 of the lenses 28 are aligned in parallel with one another, for example, in this respect. The lenses 28 of the fly's eye optics 26 lie in a common plane, for example, in this respect. An optical channel separation takes place between the at least one light reception element 8 associated with the respective lens 28 by the lenses 28 of the fly's eye optics 26.

For example, the first optical element 14 is a lens 28 of a fly's eye optics 26, wherein the fly's eye optics 26 has a plurality of lenses 28, with one respective lens 28 being associated with exactly one single light reception element 8. A one-to-one association is thereby implemented between the lens 28 and the light reception element 8.

For example, in accordance with FIG. 6, at least two light reception elements 8 form a light reception element group 36, with a respective single lens 28 of the fly's eye optics 26 being associated with a respective one light reception element group 36. In this respect, the fly's eye optics 26 is configured to image a single object point 38 on at least two different light reception elements 8, whereby a redundant imaging takes place.

In this case, image overlap regions of adjacent separate fields of view can be provided. Redundant image information is thus present. This redundant image information allows an effective suppression of interference effects.

The light reception elements 8 can optionally also be single photon avalanche diodes 40. The detection surface of the image sensor 6 in this respect has a plurality of light reception elements 8 or pixels, wherein each light reception element 8 has at least one single photon avalanche diode 40 or SPAD. A light reception element 8 in accordance with the invention can thus also have an array of single photon avalanche diodes 40. Each of the single photon avalanche diodes 40 is connected to the evaluation unit 12 directly or indirectly via further interposed components. The evaluation unit 12 is in this respect adapted to determine a distance between the image sensor 6 or the optoelectronic sensor 1 and the objects 2 in the monitored zone 4 on the basis of the received reception signals 10.

A narrow band interference filter is optionally arranged in front of the image sensor 6. Interfering extraneous light can be effectively suppressed by the narrow band interference filter.

A light transmitter can furthermore be provided with which the monitored zone 4 is illuminated. The light transmitter can be a light source, for example a light emitting diode, a light emitting diode light source, a laser diode or a laser. The light is in this respect optionally modulated, temporally modulated or transmitted cyclically pulsed. The temporal modulation can in this respect take place continuously and/or periodically, for example sinusoidally. Pulse groups can also be cyclically transmitted.

FIG. 7 shows a filter array 24 in three different views, namely in two side views and in a plan view. The filter array 24 is an additional optical element 14 which is located directly above the image sensor and which has the object of attenuating the light differently or of damping it differently in dependence on the position on the image sensor. The light reception elements, or picture elements or pixels, in a local vicinity are thereby used for different brightness zones. The different filter elements 18 have different gray values, for example.

If, for example, four adjacent light reception elements having filter elements 18 of different optical densities or different optical attenuations correspond, the dynamic range can be increased, for example by four orders of magnitude or decades, independently of the dynamics of the image sensor and in dependence on how different the different optical densities of the different filter elements 18 are selected.

In this respect, a loss of resolution of the image sensor takes place in the filter elements 18 since at least two respective light reception elements 8 image an identical object point.

In accordance with FIG. 7, the filter elements 18 of a group 30 are arranged in a rectangular area of at least four filter elements 18. A pixel is thereby formed which is so-to-say four times larger in area, but which offers a four times higher dynamic due to the four filter elements 18 each formed with different attenuation.

For example, at least one first filter element 20 and at least one second filter element 22 form a group 30. The first filter element 20 is in this respect associated with a first light reception element and the second filter element 22 is associated with a second light reception element. The light reception elements which are associated with the group 30 of filter elements 18 form a combined picture element having a high dynamic range, also called an HDR pixel.

For example, the filter elements 18 of a group 30 are arranged in a row 32 and/or in a column 34. If the filter elements 18 are arranged only in a respective row 32 or only in a respective column 34, the resolution loss is avoided in a preferred direction and only occurs in the direction in which the filter elements 18 are arranged in a group 30.

If the filter elements 18 of a group 30 are arranged in a respective one row 32 and in a respective one column 34, a spatially compact, quadratic or rectangular region can, for example, be formed for the group 30 so that, so-to-say, comparatively larger picture elements or pixels having a high dynamic range are formed.

However, other shapes of the groups 30 are also possible. It is thus conceivable that the filter elements 18 are arranged in an L shape, for example, whereby the loss of resolution is avoided in comparison with rectangular or quadratic structures.

FIG. 8 shows a fly's eye optics 26 in three different views, namely in two side views and in a plan view. A cross-talk, that is an imaging of different object points on a single light reception element, is avoided by the fly's eye optics 26 with respective individual lenses 28 for at least one light reception element. In this respect, each lens 28 of the fly's eye optics 26 has its own optical axis 50. The optical axes 50 of the lenses 28 are preferably aligned in parallel with one another in this respect. The optical axes can, however, also each be arranged at an angle with one another. It can be of advantage in this respect to image different angles of view through a fly's eye optics on adjacent light reception elements or pixels. The lenses 28 of the fly's eye optics 26 lie in a common plane, for example, in this respect. An optical channel separation takes place between the light reception elements associated with the respective lenses 28 by the lenses 28 of the fly's eye optics 26.

The fly's eye optics 26 with the individual lenses 28 has the advantage that it has a very small volume with respect to a classical, single large lens. The fly's eye optics 26 is in particular flatter than a single large lens.

FIG. 9 shows a filter array 24 and a fly's eye optics 26 in three different views, namely in two side views and in a plan view. In this respect, a respective filter element 18 of the filter array 24 is associated with a respective one lens 28 of the fly's eye optics 26.

FIG. 10 shows a filter array 24, a fly's eye optics 26 and an image sensor 6 in three different views, namely in two side views and in a plan view. In this respect, a respective filter element 18 of the filter array 24 is associated with a respective one lens 28 of the fly's eye optics 26 and with a respective one light reception element 8 of the image sensor 6.

FIG. 11 shows a filter array 24 and a fly's eye optics 26, with a respective four lenses 28 of the fly's eye optics 26 being associated with a respective one filter element 18 of the filter array 24.

FIG. 12 shows an image 46 of the image sensor in accordance with the invention. The image 46 contains no distorted image one and also no ghost image. The image 46 only contains still valid measured distance values.

FIG. 13 shows an object which should be imaged by the image sensor. FIG. 14 shows a redundant image of the object in accordance with FIG. 13 of the image sensor in accordance with the invention. In this respect, the individual image regions are overlapping so that each object point is imaged at least twice.

REFERENCE NUMERALS 1 optoelectronic sensor
2 object
4 monitored zone
5 light receiver
6 image sensor
8 light reception element
10 received signals
12 evaluation unit
14 first optical element
16 second optical element
18 filter element
20 first filter element
22 second filter element
24 filter array
26 fly's eye optics
28 lenses
30 group 32 row
34 column
36 light reception element group
38 object point
40 single photon avalanche diode
42 ghost image
44 distorted image region
46 image
48 image
50 optical axis

The invention claimed is:

1. An optoelectronic sensor for the distance measurement of objects (2) in a monitored zone (4) using a time of flight method, having a light receiver (5) for receiving light from the monitored zone (4) and for outputting received signals (10), and having an evaluation unit (12) for determining the time of flight from the received signals (10),
wherein the light receiver (5) is an image sensor (6) having a plurality of light reception elements (8) which are arranged in a planar manner in a matrix,
characterized in that:
a first optical element (14) is arranged in front of at least one light reception element (8) and wherein each light reception element (8) has at least one single photon avalanche diode (SPAD), with the first optical element (14) having a filter element (18) of a filter array (24), with at least respective first filter elements (20) and at least respective second filter elements (22) having different optical attenuations;
the first optical element (14) has a plurality of lenses (28), with a respective lens (28) associated with at least one respective light reception element (8), the plurality of lenses (28) configured to image a single object point on at least two different light reception elements, whereby a redundant imaging takes place.

2. An optoelectronic sensor in accordance with claim 1, characterized in that at least one first filter element (20) and at least one second filter element (22) form a group (30).

3. An optoelectronic sensor in accordance with claim 1, characterized in that the filter elements (18) of a group (30) are arranged in a row and/or in a column.

4. An optoelectronic sensor in accordance with claim 1, characterized in that the filter elements (18) of a group (30) are arranged in a rectangular surface of at least four filter elements (18).

5. An optoelectronic sensor in accordance with claim 1, characterized in that the plurality of lenses (28) have a fly's eye optics (26) configuration, with a respective lens (28) associated with at least one respective light reception element (8), the fly's eye optics providing said imaging of a single object point on at least two different light reception elements.

6. An optoelectronic sensor in accordance with claim 1, characterized in that the first optical element (14) is a lens (28) of a fly's eye optics, with the fly's eye optics (26) having a plurality of lenses (28), with one respective lens (28) being associated with one single light reception element (8).

7. An optoelectronic sensor in accordance with claim 1, characterized in that the light reception element (8) has at least one of said single photon avalanche diodes (40).

8. An optoelectronic sensor in accordance with claim 1, characterized in that a narrow-band interference filter is arranged in front of the image sensor (6).

9. An optoelectronic sensor for the distance measurement of objects (2) in a monitored zone (4) using a time of flight method, having a light receiver (5) for receiving light from the monitored zone (4) and for outputting received signals (10), and having an evaluation unit (12) for determining the time of flight from the received signals (10),
wherein the light receiver (5) is an image sensor (6) having a plurality of light reception elements (8) which are arranged in a planar manner in a matrix,
characterized in that:
a first optical element (14) has a lens (28) of a fly's eye optics (26), with the fly's eye optics (26) having a plurality of lenses (28), with a respective lens (28) associated with at least one respective light reception element (8) to establish a one-to-one association between the lens (28) and the light reception element (8); and
wherein each light reception element (8) has at least one single photon avalanche diode (SPAD).

10. An optoelectronic sensor in accordance with claim 9, characterized in that at least one first filter element (20) and at least one second filter element (22) form a group (30).

11. An optoelectronic sensor in accordance with claim 9, characterized in that the filter elements (18) of a group (30) are arranged in a row and/or in a column.

12. An optoelectronic sensor in accordance with claim 9, characterized in that the filter elements (18) of a group (30) are arranged in a rectangular surface of at least four filter elements (18).

13. An optoelectronic sensor in accordance with claim 9, characterized in that at least two light reception elements (8) form a light reception element group (36), with a respective single lens (28) of the fly's eye optics (26) being associated with a respective one light reception element group (36).

14. An optoelectronic sensor in accordance with claim 9, characterized in that the fly's eye optics is configured to image a single object point on at least two different light reception elements, whereby a redundant imaging takes place.

15. An optoelectronic sensor in accordance with claim 9, characterized in that the first optical element (14) is a lens (28) of a fly's eye optics, with the fly's eye optics (26) having a plurality of lenses (28), with one respective lens (28) being associated with one single light reception element (8).

16. An optoelectronic sensor in accordance with claim 9, characterized in that a narrow-band interference filter is arranged in front of the image sensor (6).

* * * * *